(12) United States Patent
Desio (10) Patent No.: US 11,988,504 B2
(45) Date of Patent: May 21, 2024

(54) SERVICE TOOL

(71) Applicant: Caterpillar Inc., Peoria, IL (US)

(72) Inventor: Matthew Francis Desio, Sherwood, AR (US)

(73) Assignee: Caterpillar Inc., Peoria, IL (US)

( * ) Notice: Subject to any disclaimer, the term of this patent is extended or adjusted under 35 U.S.C. 154(b) by 545 days.

(21) Appl. No.: 17/334,215

(22) Filed: May 28, 2021

(65) Prior Publication Data

US 2022/0381545 A1 Dec. 1, 2022

(51) Int. Cl.
| | | |
|---|---|---|
| *G01B 3/00* | (2006.01) | |
| *E02F 3/76* | (2006.01) | |
| *E02F 3/815* | (2006.01) | |
| *G01B 5/14* | (2006.01) | |

(52) U.S. Cl.
CPC ............ *G01B 3/004* (2013.01); *E02F 3/7636* (2013.01); *E02F 3/8152* (2013.01); *G01B 5/14* (2013.01)

(58) Field of Classification Search
CPC ......... G01B 3/004; G01B 5/14; E02F 3/7636; E02F 3/8152; E02F 3/844; E02F 9/264
See application file for complete search history.

(56) References Cited

U.S. PATENT DOCUMENTS

| | | | |
|---|---|---|---|
| 888,173 | A | 5/1908 | Justice |
| 1,181,900 | A | 5/1916 | Leishman |
| 1,295,041 | A | 2/1919 | Kekuewa |
| 11,686,067 | B2 * | 6/2023 | Veasy ................ E02F 3/7645 701/50 |
| 11,702,818 | B2 * | 7/2023 | Veasy ................ E02F 3/7645 701/36 |
| 2016/0208460 | A1 * | 7/2016 | Kirsch ................ E02F 3/764 |
| 2020/0362535 | A1 * | 11/2020 | Veasy ................ E02F 3/765 |
| 2020/0362542 | A1 * | 11/2020 | Veasy ................ E02F 3/765 |
| 2022/0049455 | A1 * | 2/2022 | Kobayashi ........... E02F 3/8152 |
| 2022/0381545 | A1 * | 12/2022 | Desio ................ E02F 3/844 |

FOREIGN PATENT DOCUMENTS

WO    9842521 A1    10/1998

OTHER PUBLICATIONS

Quality Tools & Solutions, "Acrylic Triangle Scale 30cm 2pc-pack with Grid Scale", Measuring Tools, Our Products, Jan. 28, 2021, qts.tools/our-products/measuring-tools/acrylic-triangle-scale-30cm-2pc-pack-with-grid-scale.html.
J&B Sewing Machines, "TrueCut 90 Degree Right Triangle Ruler £19.95 inc VAT", Sewing Accessories, Jan. 28, 2021, https://www.jbsewing.com/en/90-degrees-right-triangle-ruler.

* cited by examiner

*Primary Examiner* — Yaritza Guadalupe-McCall
(74) *Attorney, Agent, or Firm* — von Briesen & Roper, s.c.

(57) ABSTRACT

A service tool and method of using for calibrating a position of a cutting edge of a blade. The service tool may comprise an inward-side face disposed between a first face and a second face. The inward-side face may include a curved portion, a leg portion and a notch configured to receive the cutting edge. The first face includes a curved edge, a plurality of horizontal lines and a plurality of vertical lines. When the cutting edge is received in the notch, and the curved portion abuts the top face of a bolt, the plurality of horizontal lines is configured to measure a vertical distance from a center of the top face to the cutting edge, and the plurality of vertical lines is configured to measure a horizontal distance from the center of the top face to the cutting edge.

20 Claims, 9 Drawing Sheets

SERVICE TOOL

TECHNICAL FIELD

The present disclosure generally relates to service tools for blade calibration, and more particularly, for calibrating blade wear on motor graders.

BACKGROUND

Systems that assist with or control blade position on a work machine need to "know" or determine the position of the cutting edge of the blade, or more specifically the cutting edge of the replaceable member(s) of the blade, so that the system can accurately position the cutting edge during operation of the machine. Typically, the horizontal distance/length and the vertical distance/length are each measured manually from a center of a bolt (that couples a replaceable member to the rest of the blade) to the cutting edge and then entered into a blade position control system. The process is generally performed for two different bolts located at opposite ends of the blade. Furthermore, as a replaceable member contacts material during use of the blade, the replaceable member may wear down. Over time, this wear can change the position of the cutting edge of the blade/replaceable member such that the position of the cutting edge should be recalibrated during maintenance in a shop or in the field In the current process, the above measurements are taken manually with a carpenter's square and a level. This process can be difficult because of the position of the blade relative to the frame of the machine and other components. The technician's head is usually much higher than the measuring surface. Often the technician must crouch down while maintaining the level steady and leaning the carpenter's square against the bolt and cutting edge. Each instrument is prone to slip and the problem is exacerbated by awkward access to the blade. Such a process does not always provide consistent or desired results.

WO98/42521, published Oct. 1, 1998, discloses a flat instrument in the shape of a right triangle for drawing or cutting out geometrical shapes. The instrument consists of a thin transparent plate provided with markings. While beneficial for flat surface work such as cutting or measuring shapes on a work desk, this instrument does not address the difficulties experienced above. A better instrument is needed.

SUMMARY OF THE DISCLOSURE

In one aspect of the present disclosure, a method is disclosed of calibrating a position of a cutting edge of a blade disposed on a machine. The blade includes a moldboard coupled to a replaceable member by a plurality of bolts. The replaceable member includes the cutting edge disposed at a bottom of a front surface of the replaceable member. The method may comprise: performing for a first bolt and, optionally, a second bolt, of the plurality of bolts, the first bolt and the second bolt each respectively a measured bolt: abutting a notch of a service tool against the cutting edge and abutting a curved portion of the service tool against the front surface of the replaceable member and against a top face of a head of the measured bolt, wherein the service tool includes an inward-side face disposed between a first face and a second face, the inward-side face including the curved portion and the notch, the first face including a first curved edge, a plurality of horizontal lines marked on the first face and a plurality of vertical lines marked on the first face, wherein the first curved edge of the first face of the service tool is positioned adjacent to a center diameter of the top face of the head of the measured bolt; identifying a horizontal line on the first face that ends adjacent to a center of the top face of the head of the measured bolt; measuring a vertical distance from the center of the top face to the cutting edge by identifying a first measurement associated with the horizontal line identified on the first face; identifying a vertical line on the first face that ends adjacent to the center of the top face of the head of the measured bolt; and measuring a horizontal distance from the center of the top face to the cutting edge by identifying a second measurement associated with the vertical line identified. The method further comprises calibrating the position of the cutting edge by providing to a grade control system the vertical distance and the horizontal distance measured for the first bolt and, optionally, the vertical distance and horizontal distance measured for the second bolt.

In another aspect of the disclosure, a service tool is disclosed for calibrating a position of a cutting edge of a blade disposed on a machine. The blade includes a moldboard coupled to a replaceable member by a plurality of bolts. The replaceable member including the cutting edge disposed at a bottom of a front surface of the replaceable member. The service tool may comprise an inward-side face disposed between a first face and a second face. The inward-side face may include a curved portion, a leg portion and a notch defined by the junction of the curved portion and the leg portion. The notch is configured to receive the cutting edge when the curved portion abuts the front surface of the replaceable member. The first face includes a first curved edge, a plurality of horizontal lines marked on the first face and a plurality of vertical lines marked on the first face. The second face is disposed opposite to the first face. When the cutting edge is received in the notch, and the curved portion abuts the front surface and the top face of the head of a first bolt of the plurality of bolts, the plurality of horizontal lines is configured to measure a vertical distance from a center of the top face to the cutting edge, and the plurality of vertical lines is configured to measure a horizontal distance from the center of the top face to the cutting edge.

In yet another aspect of the disclosure, a method is disclosed of calibrating a position of a cutting edge of a blade disposed on a machine, the blade including a moldboard coupled to a replaceable member by a plurality of bolts, the replaceable member including a cutting edge disposed at a bottom of a front surface of the replaceable member. The method may comprise: performing for a first bolt and, optionally, a second bolt, of the plurality of bolts, the first bolt and the second bolt each respectively a measured bolt: abutting a notch of a service tool against the cutting edge and abutting a curved portion of the service tool against the front surface of the replaceable member and against a top face of a head of a measured bolt, wherein a first curved edge of a first face of the service tool is positioned adjacent to a center diameter of the top face of the head of the measured bolt, wherein the service tool includes an inward-side face disposed between the first face and a second face, the inward-side face including the curved portion, a leg portion disposed below the curved portion and the notch defined by the junction of the curved portion and the leg portion, the first face including a first curved edge, a plurality of horizontal lines marked on the first face and a plurality of vertical lines marked on the first face; identifying a horizontal line on the first face that ends adjacent to a center of the top face of the head of the measured bolt; measuring a vertical distance from the center of the top face to the cutting edge by identifying a first measurement associated with the horizontal line identified on the first face; identifying a vertical line that ends adjacent to the center of the top face of the head of the measured bolt; measuring a horizontal distance from the center of the top face to the cutting edge by identifying a second measurement associated with the vertical line identified; abutting the cutting edge against the notch and abutting the curved portion of the service tool against the front surface of the replaceable member and against the top face of the head of the measured bolt, wherein a second curved edge of the second face of the service tool is disposed adjacent to the center diameter of the top face of the head of the measured bolt, wherein the second face includes the second curved edge, a second plurality of horizontal lines marked on the second face and a plurality of hypotenuse lines marked on the second face; identifying a hypotenuse line and an other horizontal line on the second face that both end adjacent to the center of the top face of the head of the bolt; and measuring a hypotenuse distance from the center of the top face to the cutting edge by identifying a third measurement associated with the other horizontal line identified on the second face. The method further comprises calibrating the position of the cutting edge by providing to a grade control system the vertical distance and the horizontal distance and the hypotenuse distance measured for the first bolt and the vertical distance and horizontal distance and the hypotenuse distance measured for the second bolt.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
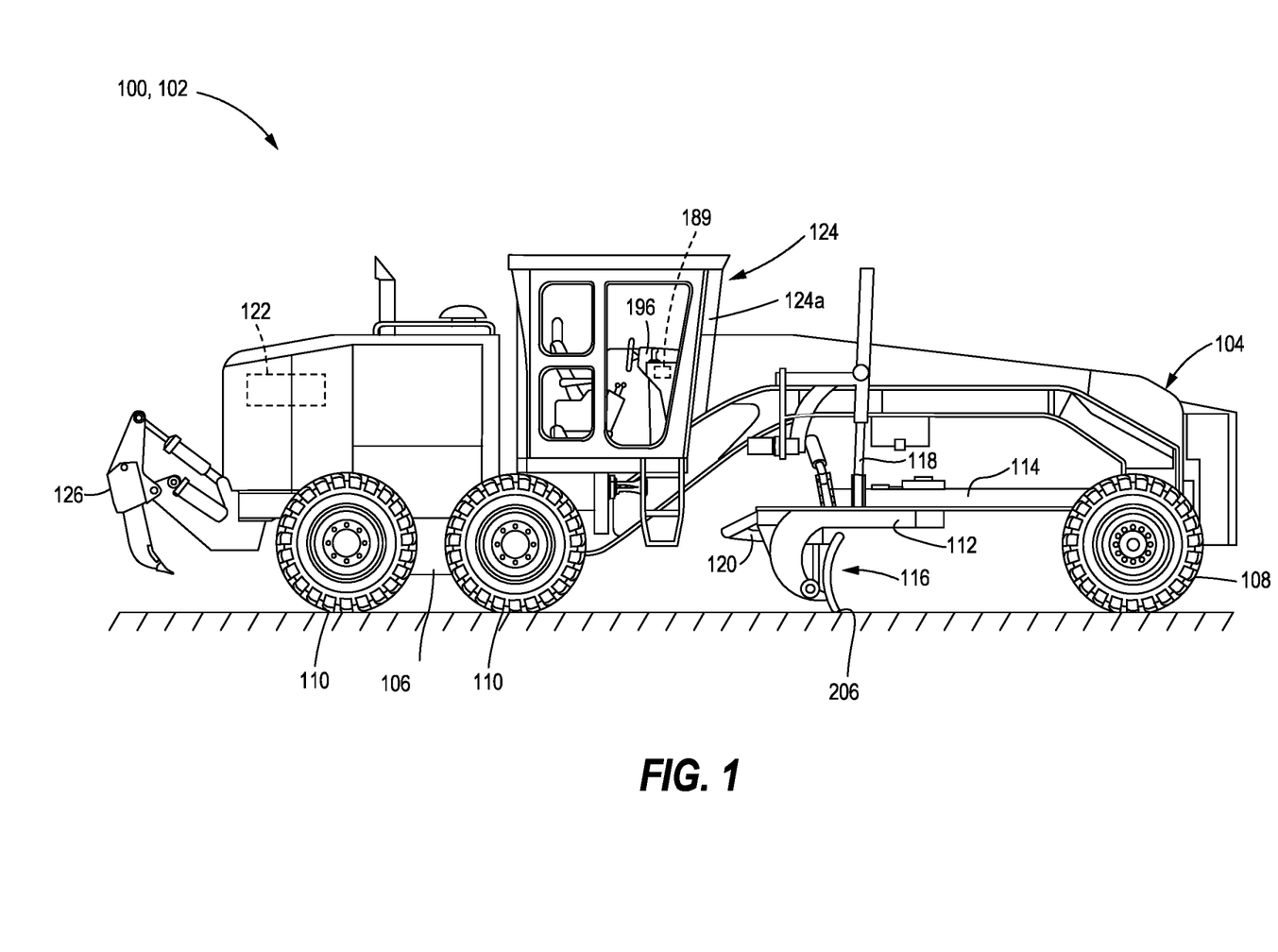
FIG. 1 is a side view of an exemplary machine that includes a blade for which cutting edge calibration may be done utilizing the teachings of this disclosure.

FIG. 1 illustrates one example of a machine 100 that incorporates the features of the present disclosure. The exemplary machine 100 may be a vehicle such as motor grader 102. While the following detailed description and drawings are made with reference to a motor grader 102 as the exemplary machine 100, the teachings of this disclosure may be employed on other machines 100 that include a blade, including but not limited to, tractors, skid steer loaders or dozers.

The motor grader 102 may include a front frame 104 pivotally coupled to a rear frame 106 by a hitch (not shown), which facilitates steering of the front frame 104 relative to the rear frame 106. The motor grader 102 may further include front wheels 108 and a pair of tandem rear wheels 110. A circle drive gear 112 may be supported by a drawbar 114 connected to the front frame 104. A portion of the circle drive gear 112 may be configured to extend downwardly to pivotally support a blade 116. The blade 116 may be moved or adjusted to obtain a range of different positions and angles by way of the circle drive gear 112 and a pair of lift actuators 118 and a tilt actuator 120 mounted on the front frame 104.

The rear frame 106 of the motor grader 102 may house an engine 122 and other power train components (not shown) for generating and delivering power to operate the motor grader 102. The engine 122 may be any of a gasoline, diesel, or any other engine 122 employed with such machines 100. The motor grader 102 may even draw power from other power sources, such as natural gas, fuel cells, batteries, etc. Relatedly, while the transmission (not shown) of the motor grader 102 may typically be a continuous variable transmission (CVT), in at least some embodiments, the transmission may be any of a variety of types that are commonly employed in work or construction machines. For example, in some embodiments, the transmission may be automatic, semi-automatic, manual, direct-drive, or any transmission having a variable output or modulated gear ratio.

An operator compartment 124 is disposed on a rear portion of the front frame 104. The operator compartment 124 is configured to house control levers, joysticks, push buttons, and other types of control elements typically known in the art for actuating an operation of the motor grader 102. In an embodiment, the operator compartment 124 may be a cab 124a. In other embodiments, the operator compartment 124 may not enclose the operator (e.g., in a cab 124a such as the one shown in FIG. 1) but may instead be open to the environment with a roll-over-protection (ROP) apparatus (not shown) (e.g., a roll-cage or the like) visible. The rear frame 106 may also be employed to attach any additional work implements 126, such as a ripper arrangement, or the like.

Figure 2:
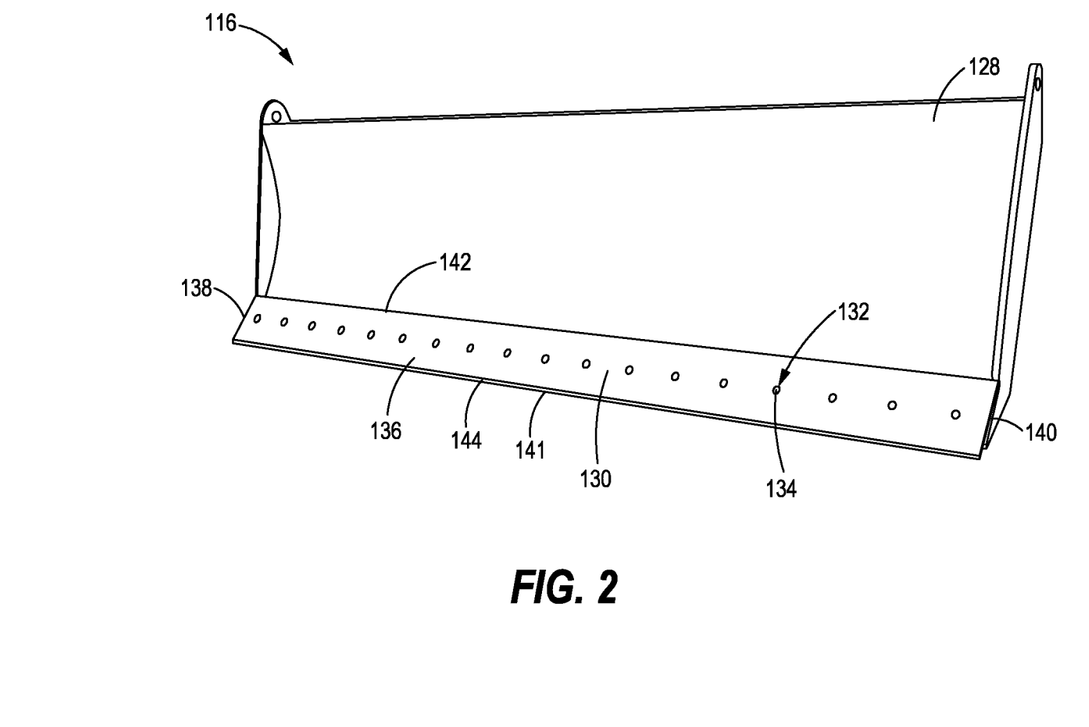
FIG. 2 is a perspective view of an embodiment of the blade of the exemplary machine of FIG. 1.

FIG. 2 illustrates the blade 116. In an embodiment, the blade 116 includes a moldboard 128 and one or more replaceable members 130 coupled to the lower portion of the moldboard 128 by a plurality of bolts 132 and bolt fasteners (not shown). Each bolt 132 includes a head 134 and a shaft (not shown). In an embodiment, the blade 116 may have a curved profile (best seen in FIG. 1) when viewed from the side of the blade 116 or motor grader 102.

The replaceable member 130 includes a front surface 136 that extends between a first side edge 138 and a second side edge 140 of the replaceable member 130. The replaceable member 130 further includes a top edge 142 disposed at the top of the front surface 136, and a (leading) cutting edge 144 disposed at the bottom 141 of the front surface 136 of the replaceable member 130 (and blade 116). The front surface 136 may have a generally concave shape or a curved profile (between the top edge 142 and the cutting edge 144 when viewed from the side of the replaceable member 130). In an embodiment, the depth of the concavity of the replaceable member 130 may be relatively shallow. The replaceable member 130 further includes a plurality of recesses (not shown) and a plurality of bores (not shown) disposed across the replaceable member 130. The plurality of recesses and plurality of bores may be disposed in a one-to-one correspondence, and each recess and associated bore can be aligned coaxially. Each bore is configured to receive a shaft (not shown) of one of the bolts 132 and each recess is configured to receive and retain a head 134 of the same bolt 132. When properly positioned in the recess, a top face 182 of the head 134 is generally flush with the front surface 136 of the replaceable member 130.

Figure 7:
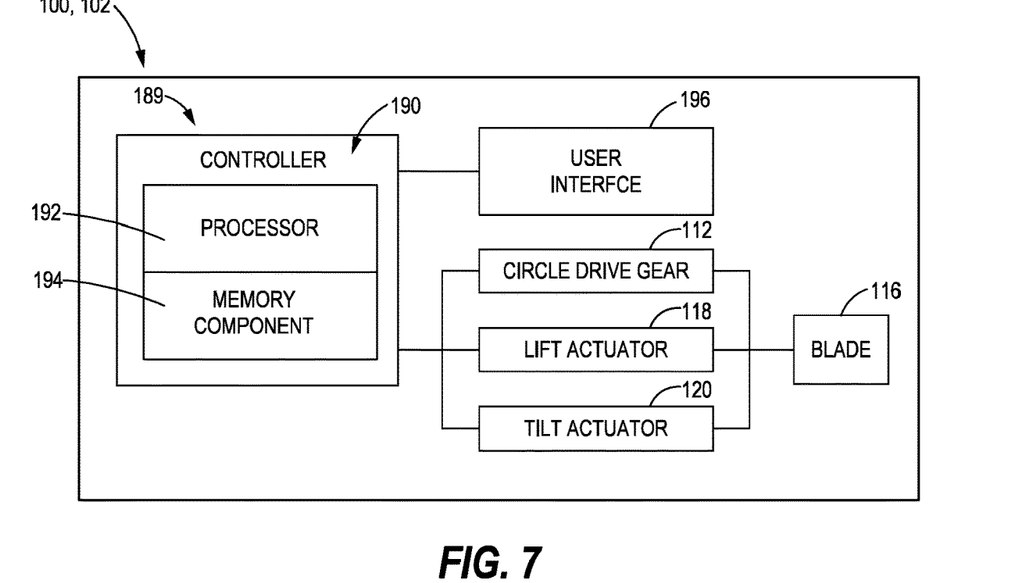
FIG. 7 is an exemplary schematic of a grade control system for the machine 100.

The machine 100 or motor grader 102 may further include a grade control system 189 configured to automatically determine the position 206 of the cutting edge 144 during operation of the blade. The grade control system 189 may include a controller 190 (FIG. 7) configured to positionally calibrate ("calibrate") a replaceable member 130 of the motor grader 102 for use in determining the position 206 of the cutting edge 144 during operation of the blade based on the horizontal distance H (best seen in FIG. 5) and/or vertical distance V, and/or hypotenuse distance C (FIG. 4) (from a center 180 of each of one or more heads 134 of bolts 132) received from the user interface 196 (e.g., prior to the use of a new or replacement replaceable member 130, during maintenance, or inspection etc.) Said another way, such calibrating may include an initial (prior to the use of a new or replacement replaceable member 130) calibration of the horizontal distance H and/or vertical distance V, and/or hypotenuse distance C (each from a center 180 of each of one or more heads 134 of the bolts 132) or may include subsequent (e.g., during maintenance or inspection of a used replaceable member 130) calibration of the horizontal distance H and/or vertical distance V, and/or hypotenuse distance C from a center 180 of each of one or more heads 134 (of bolts 132).

The controller 190 is in operable communication with the circle drive gear 112, lift actuator 118 and/or tilt actuator 120. The controller 190 (FIG. 7) may be configured to transmit control signals to the circle drive gear 112, lift actuator 118 and/or tilt actuator 120 to automatically position or assist with positioning of the cutting edge 144 of the blade 116 based on the horizontal distance H and vertical distance V (and in some embodiments also based on the hypotenuse distance C) from a center 180 of one or more heads 134 (of bolts 132) to the cutting edge 144 as measured by the service tool 146 and provided to the controller 190 via a user interface 196 that is in operable communication with the controller 190.

The controller 190 (FIG. 7) may include a processor 192 and a memory component 194. The processor 192 may be a microcontroller, a digital signal processor (DSP), an electronic control module (ECM), an electronic control unit (ECU), a field-programmable gate array (FPGA), a microprocessor or any other suitable processor 192 as known in the art. The processor 192 may execute instructions and generate control signals for determining a position 206 of the cutting edge 144 of the blade 116 based on the horizontal distance H and vertical distance V (and in some embodiments also based on the hypotenuse distance C) received from the user interface 196. The processor 192 may execute instructions and generate control signals for automatically moving the blade 116 to move the cutting edge 144 to the determined position 206. Such instructions may be read into or incorporated into a computer readable medium, such as the memory component 194 or provided external to the processor 192. In alternative embodiments, hard wired circuitry may be used in place of, or in combination with, software instructions to implement a control method, or the processing elements may be located remotely from the machine 100 with suitably connectivity thereto.

The term "computer readable medium" as used herein refers to any non-transitory medium or combination of media that participates in providing instructions to the processor 192 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 190 is not limited to one processor 192 and memory component 194. The controller 190 may include several processors 192 and memory components 194. In an embodiment, the processors 192 may be parallel processors that have access to a shared memory component(s) 194. In another embodiment, the processors 192 may be part of a distributed computing system in which a processor 192 (and its associated memory component 194) may be located remotely from one or more other processor(s) 192 (and associated memory components 194) or FPGA(s) that are part of the distributed computing system. The controller 190 may also be configured to retrieve from the memory component 194 and formulas and other data necessary for the calculations discussed herein.

Figure 3:
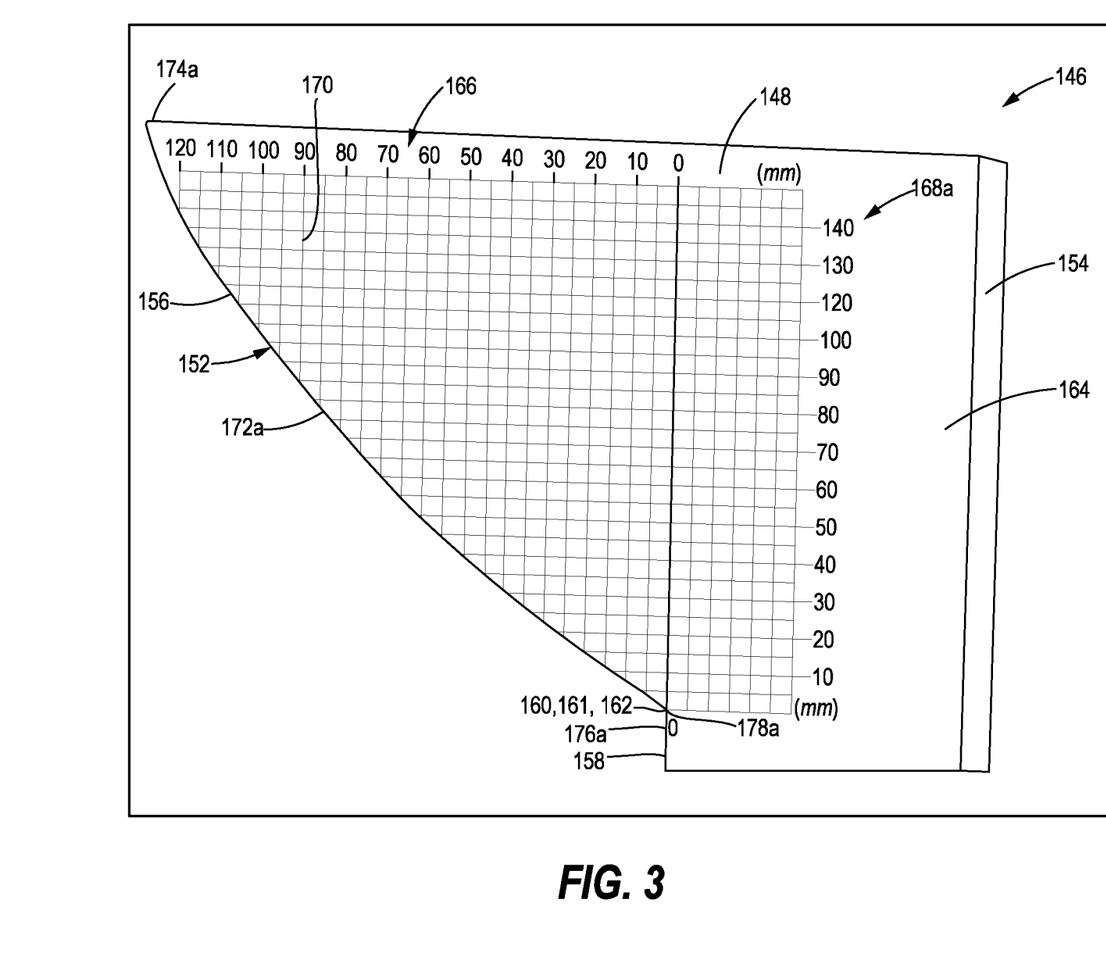
FIG. 3 illustrates an exemplary embodiment of the first face of a service tool.

Referring now to FIG. 3, a service tool 146 is shown for use in calibrating a position of the replaceable member 130 of the blade 116. The service tool 146 (FIG. 3) includes a first face 148, a second face 150, an inward-side face 152 and an outward-side face 154.

Figure 5:
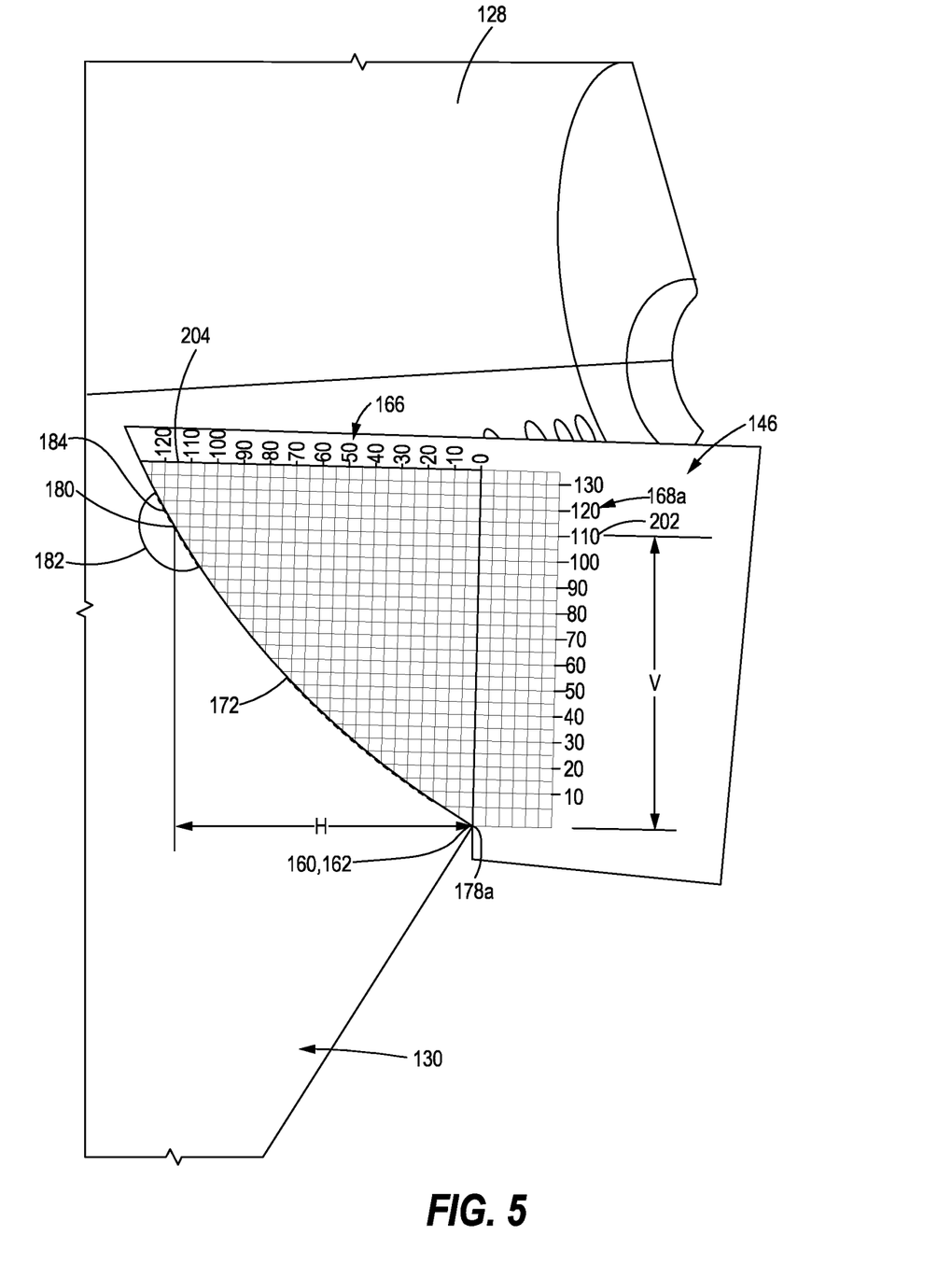
FIG. 5 is a perspective view of the embodiment of the service tool of FIG. 3 positioned to measure a horizontal distance H and a vertical distance V from the center of the top face of a head of a bolt to the cutting edge.
Figure 6:
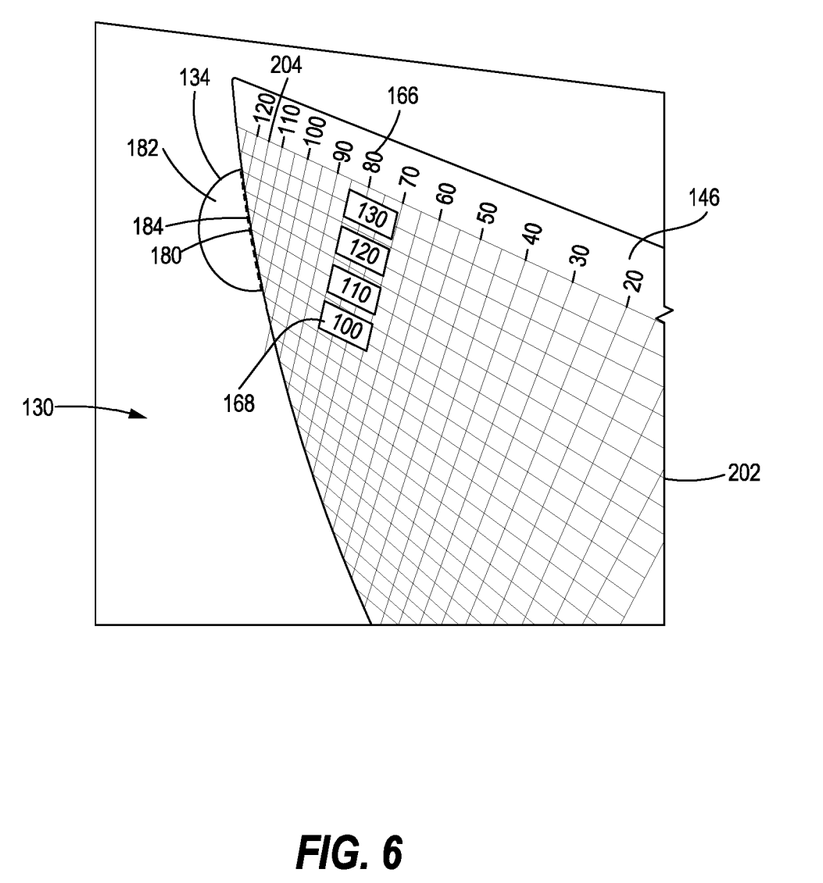
FIG. 6 is an enlargement of a portion of FIG. 5, except that the measurements of vertical distance are shown in an alternative labeling format (disposed adjacent to the horizontal lines) lines inside the grid.

The inward-side face 152 is disposed between the first face 148 and the second face 150 of the service tool 146. The inward-side face 152 (FIG. 8) includes a curved portion 156 and a leg portion 158. The curved portion 156 of the inward-side face 152 is configured to sit flush against or abut the (concave shape of) front surface 136 of the replaceable member 130 (see FIGS. 5-6). As shown in FIG. 5, in an embodiment, all of the curved portion 156 may abut the front surface 136 of the replaceable member 130. In an embodiment, the curved portion 156 may be configured to be reciprocally shaped to at least a portion of the front surface 136 of the replaceable member 130. For example, the curved portion 156 may be generally convex shaped so that it may rest substantially flushly against a concave part of a front surface 136 of a replaceable member 130. The leg portion 158 (FIG. 8) is disposed below the curved portion 156. In an embodiment, the leg portion 158 extends downward in a generally vertical direction from the curved portion 156 (best seen in FIG. 3).

Figure 8:
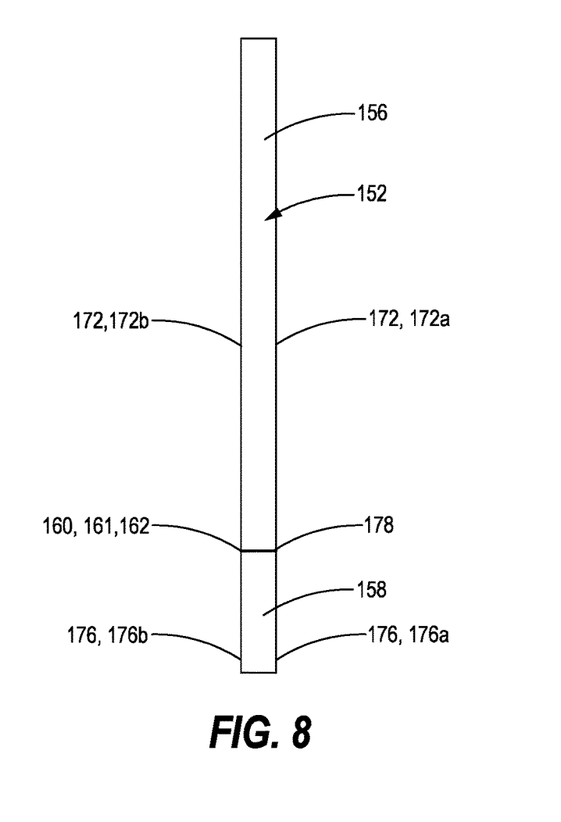
FIG. 8 is a side view of the inward-side face of the service tool of FIG. 3.

As shown in FIGS. 3 and 8, the junction 161 of the curved portion 156 and the leg portion 158 defines a notch 160 on the inward-side face 152. In an embodiment, the notch 160 may be configured as a corner 162. The notch 160 is configured to receive (best seen in FIG. 5) the cutting edge 144 of the replaceable member 130 when the curved portion 156 is positioned abutting the front surface 136 of the replaceable member 130. When so received, the curved portion 156 may be disposed flush or substantially flush to the front surface 136 of the replaceable member 130, and the cutting edge 144 may abut against the notch 160 (the curved portion 156 of the notch 160 (and curved edge 172 as discussed below) and/or the leg portion 158 (and leg edge 176 as discussed below) of the notch 160). In another embodiment, when so received, the curved portion 156 may be partially or entirely disposed flush to the front surface 136 of the replaceable member 130, and the cutting edge 144 abuts both of the curved portion 156 (and curved edge 172 as discussed below) and the leg portion 158 (and leg edge 176 as discussed below) that define the notch 160.

The outward-side face 154 (FIG. 3) of the service tool 146 is disposed between the first face 148 and the second face 150 and is disposed generally opposite to the inward-side face 152.

The service tool 146 includes a handle portion 164 configured to be held by a user. The handle portion 164 is defined by the outward-side face 154, a part of the first face 148 that is disposed distal to the replaceable member 130 and adjacent to the outward-side face 154, and a portion of the second face 150 that is disposed distal to the replaceable member 130 and adjacent to the outward-side face 154. The handle portion 164 is disposed on the opposite side of the service tool 146 than the inward-side face 152.

The first face 148 of the service tool 146 may be generally planar and includes a plurality of vertical lines 166 and a first plurality of horizontal lines 168a (both marked on the first face 148). The vertical lines 166 are/may be uniformly spaced apart. In the embodiment shown in FIG. 3, the series of vertical lines 166 (of the plurality of vertical lines 166) are in millimeter (mm) measurements in graduations of five mm. In other embodiments, the series of vertical lines 166 may be in other units (e.g., centimeters, inches, etc.) with other desired graduations. Similarly, the first plurality of horizontal lines 168a are/may be uniformly spaced apart. In the embodiment shown in FIG. 3, the series of horizontal lines 168a (of the first plurality of horizontal lines 168a) are in millimeter (mm) measurements in graduations of five mm. In other embodiments, the series of horizontal lines 168a (of the first plurality of horizontal lines 168a) may be in other units (e.g., centimeters, inches, etc.) with other desired graduations. The vertical lines 166 and the horizontal lines 168a form a grid 170. Although the vertical lines 166 and horizontal lines 168a are shown as being straight and respectively orthogonal, non-orthogonal or even curved lines also could be provided.

The first face 148 of the service tool 146 further includes a curved edge 172a and an upper edge 174a and a leg edge 176a. The curved edge 172a is disposed below the upper edge 174a and at a junction/joining of the first face 148 and the curved portion 156 (of the inward-side face 152). The leg edge 176a is disposed below the curved edge 172a and at a junction/joining of the first face 148 and the leg portion 158 (of the inward-side face 152). The leg edge 176a is oriented transverse to the curved edge 172a. The curved edge 172a has a convex profile that is reciprocal to the concave shape of the replaceable member 130. The curved edge 172a extends from the upper edge 174a of the service tool 146 to the notch 160 (or start of the leg edge 176a).

The meeting of the curved edge 172a and the leg edge 176a may define an origin point 178a (or zero point which the cutting edge 144 is disposed adjacent to) on the first face 148 from which the vertical distance V (see FIG. 5) from the approximate center 180 of the top face 182 of the head 134 to the (tip of the) cutting edge 144 may be measured by the service tool 146, and from which the horizontal distance H from the approximate center 180 of the head 134 to the (tip of the) cutting edge 144 may be measured using the service tool 146 when the cutting edge 144 of the replaceable member 130 (that is coupled to the moldboard 128 of the blade 116) is received in the notch 160 and abuts the curved portion 156 and/or the leg portion 158 (that is adjacent to the notch 160. Measurement(s) 202 for the vertical distance may be disposed on the first face 148 adjacent to the horizontal lines 168a. Measurement(s) 204 for the horizontal distance may be disposed on the first face 148 adjacent to the vertical lines 166.

Figure 4:
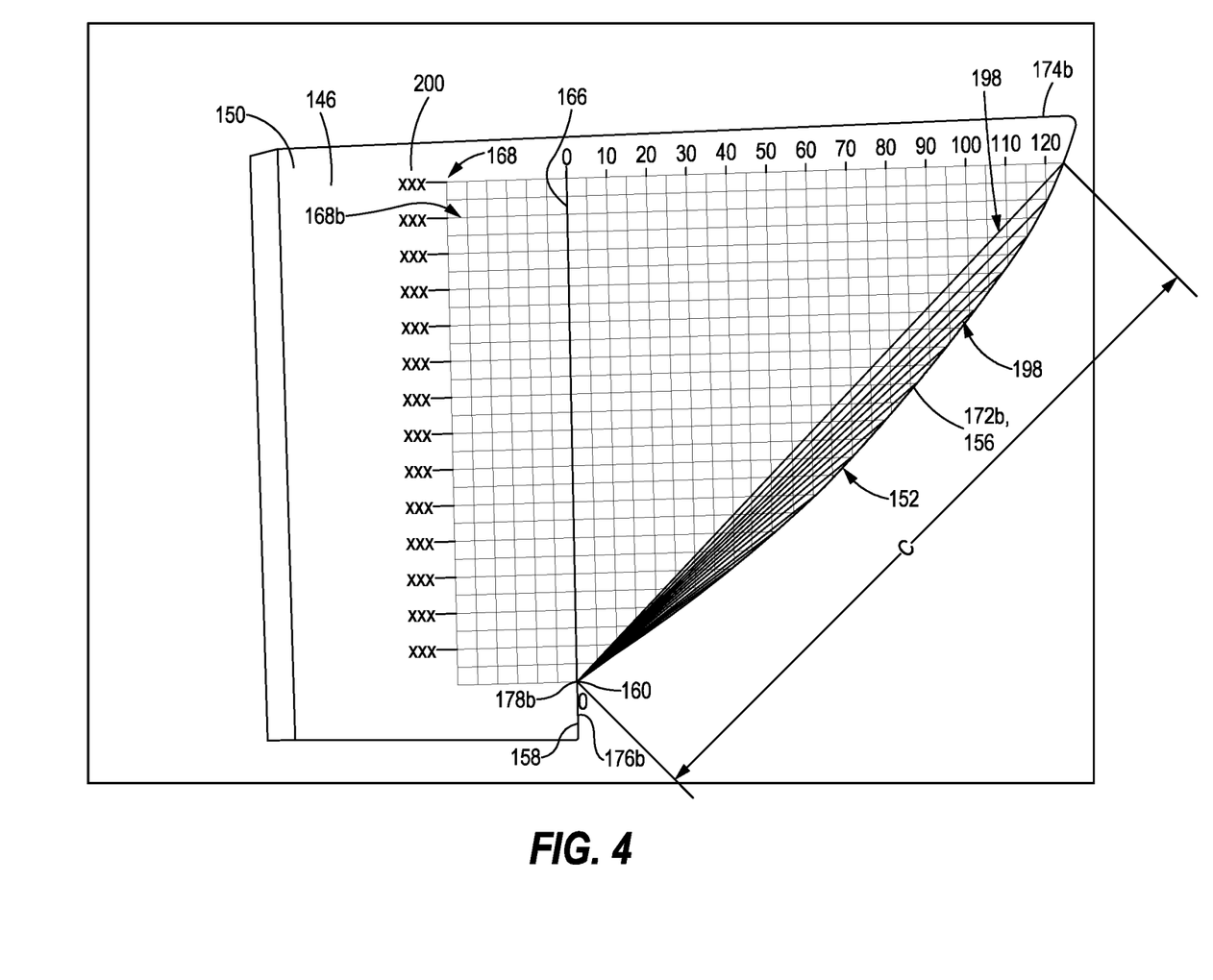
FIG. 4 illustrates an exemplary second face of the service tool of FIG. 3.

Turning now to FIG. 4, the second face 150 may be generally planar and disposed opposite to the first face 148. Similar to the first face 148, the second face 150 of the service tool 146 further includes a second curved edge 172b and a second upper edge 174b and a second leg edge 176b. The second curved edge 172b is disposed below the second upper edge 174b and at a junction/joining of the second face 150 and the curved portion 156 (of the inward-side face 152). The second leg edge 176b is disposed below the second curved edge 172b and at a junction/joining of the second face 150 and the leg portion 158 (of the inward-side face 152). The second leg edge 176b is oriented transverse to the second curved edge 172b. The second curved edge 172b has a convex profile that is reciprocal to the concave shape of the replaceable member 130. The second curved edge 172b extends from the second upper edge 174b of the service tool 146 to the notch 160 (or start of the leg edge 176b). The meeting of the second curved edge 172b and the second leg edge 176b may define an origin point 178b (or zero point which the cutting edge 144 is disposed adjacent to) on the second face 150.

The second face 150 may include a second plurality of horizontal lines 168b (marked on the second face 150) that are the same as those on the first face 148. The second face 150 further includes a plurality of hypotenuse lines 198 (marked on the second face 150). Each hypotenuse line 198 originates at the end point on the second curved edge 172b of one of the horizontal lines 168b and ends at the origin 178b (or zero point) marked on the second face 150. Each hypotenuse line 198 representing the distance of longest side of the right triangle formed by the horizontal line 168b and an intersecting vertical line 166 that extends upward from the origin 178b. In the embodiment shown in FIG. 4, the series of hypotenuse lines 198 are in millimeter (mm) measurements. In other embodiments, the series of hypotenuse lines 198 may be in other units (e.g., centimeters, inches, etc.) with other graduations. The (diagonal) hypotenuse distance C of the hypotenuse line 198 from the approximate center 180 of the top face 182 of the head 134 to the (tip of the) cutting edge 144 may be measured by the service tool 146, when the cutting edge 144 of the replaceable member 130 (that is coupled to the moldboard 128 of the blade 116) is received in the notch 160 and abuts the curved portion 156 and/or the leg portion 158 (that is adjacent to the notch 160. For clarity and ease in viewing, on the second face 150, a measurement 200 of the hypotenuse distance C of each such hypotenuse line 198 may be disposed next to the horizontal line 168b (on the second face 150) that forms one side of the right angle. In other words, the second plurality of horizontal lines 168b may be configured to identify measurements of the hypotenuse distances C represented by the plurality of hypotenuse lines 198. For simplicity, measurements 200 are set out on FIG. 4 as "XXX".

Also disclosed is a method of calibrating a position 206 of a cutting edge 144 of a blade 116 disposed on a machine 100, the blade 116 including a moldboard 128 coupled to a replaceable member 130 by a plurality of bolts 132, the replaceable member 130 including a cutting edge 144 disposed at a bottom 141 of a front surface 136 of the replaceable member 130. The method comprising: (1) individually, for each of a first bolt 132 and a second bolt 132 of the plurality of bolts 132: (a) abutting a notch 160 of the service tool 146 against the cutting edge 144 and abutting a curved portion 156 of the service tool 146 against the front surface 136 of the replaceable member 130 and against a top face 182 of a head 134 of a bolt 132, wherein a first curved edge 172a of a first face 148 of the service tool 146 is positioned adjacent to a center diameter 184 of the top face 182 of the head 134 of the bolt 132, wherein the service tool 146 includes an inward-side face 152 disposed between the first face 148 and a second face 150, the inward-side face 152 including the curved portion 156, a leg portion 158 disposed below the curved portion 156 and the notch 160 defined by the junction 161 of the curved portion 156 and the leg portion 158, the first face 148 including a first curved edge 172a, a plurality of horizontal lines 168a marked on the first face 148 and a plurality of vertical lines 166 marked on the first face 148; (b) identifying a horizontal line 168a on the first face 148 that ends adjacent to a center 180 of the top face 182 of the head 134 of the bolt 132; (c) measuring a vertical distance V from the center 180 of the top face 182 to the cutting edge 144 by identifying a first measurement 202 associated with the horizontal line 168a identified in (b); (d) identifying a vertical line 166 that ends adjacent to the center 180 of the top face 182 of the head 134 of the bolt 132; (e) measuring a horizontal distance H from the center 180 of the top face 182 to the cutting edge 144 by identifying a second measurement 204 associated with the vertical line 166 identified in (d); (f) abutting the cutting edge 144 against the notch 160 and abutting the curved portion 156 of the service tool 146 against the front surface 136 of the replaceable member 130 and against the top face 182 of the head 134 of the bolt 132, wherein a second curved edge 172b of the second face 150 of the service tool 146 is disposed adjacent to the center diameter 184 of the top face 182 of the head 134 of the bolt 132, wherein the second face 150 includes the second curved edge 172b, a second plurality of horizontal lines 168b marked on the second face 150 and a plurality of hypotenuse lines 198 marked on the second face 150; (g) optionally, identifying a hypotenuse line 198 and another horizontal line 168b on the second face 150 that both end adjacent to the center 180 of the top face 182 of the head 134 of the bolt 132; and (h) optionally, measuring a hypotenuse distance C from the center 180 of the top face 182 to the cutting edge 144 by identifying a third measurement 200 associated with the other horizontal line 168b identified in (g); and (2) calibrating the position 206 of the cutting edge 144 by providing to a grade control system 189 the vertical distance V and the horizontal distance H and optionally, the hypotenuse distance C measured for the first bolt 132 and the vertical distance V and horizontal distance H and the hypotenuse distance C measured for the second bolt 132.

INDUSTRIAL APPLICABILITY

In general, the foregoing disclosure finds utility in machines 100, for example motor graders 102, that have a blade 116 that include one or more replaceable members 130 and also include a (automatic) grade control system 189.

Figure 9:
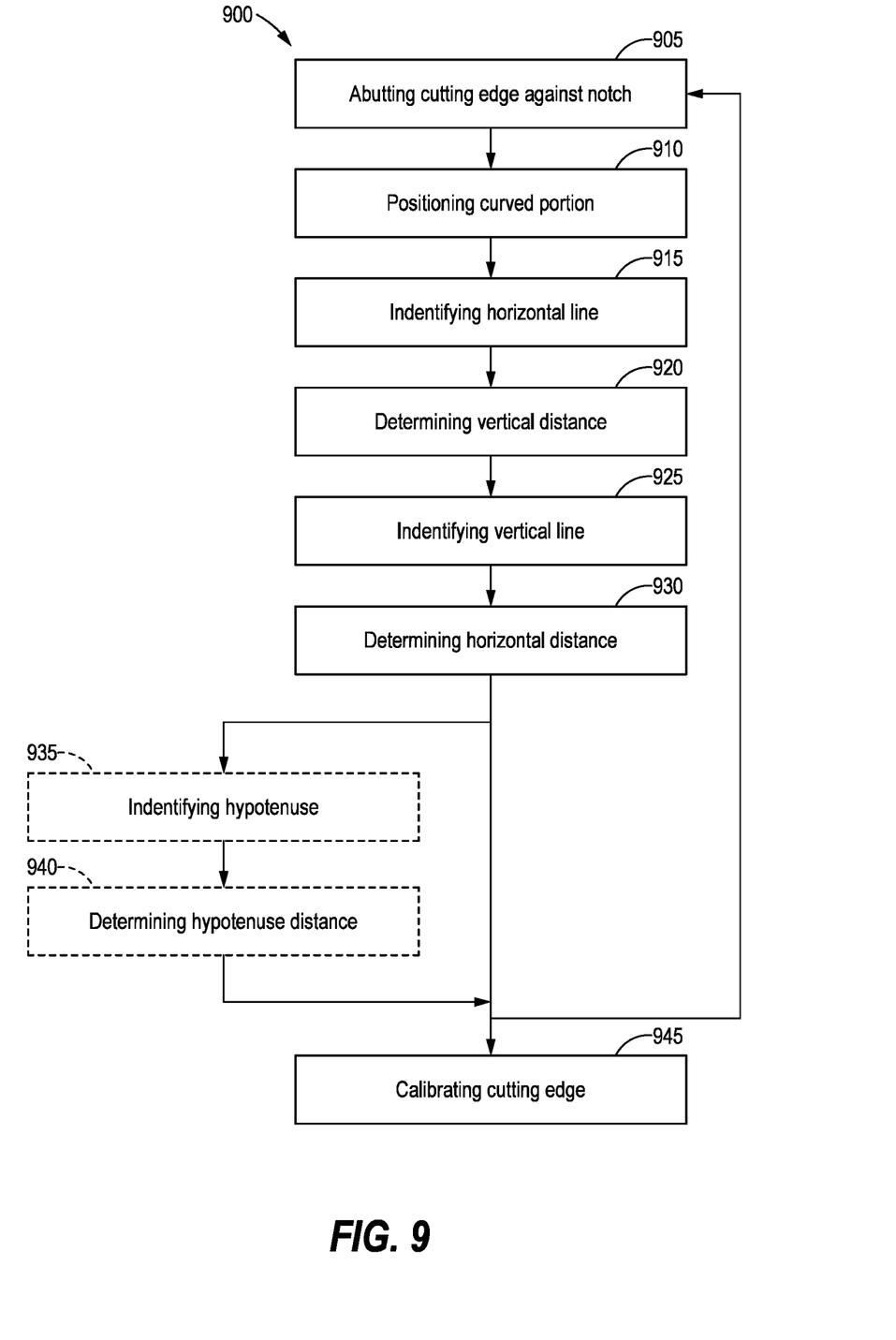
FIG. 9 is method of calibrating the position of a cutting edge of a blade.

Referring now to FIG. 9 an exemplary flowchart is illustrated showing sample blocks which may be followed in a method 900 of calibrating a position of a replaceable member 130 of a blade 116.

In block 905, the method 900 includes holding the service tool 146 by the handle portion 164, and abutting the cutting edge 144 (of the replaceable member 130 that is coupled to a moldboard 128) against the notch 160 of the service tool 146. More specifically, this step includes abutting the cutting edge 144 at the junction 161 of the curved portion 156 and the leg portion 158 of the inward-side face 152 of the service tool 146 (see also FIG. 5).

In block 910, the method further includes positioning the curved portion 156 against the front surface 136 (of the replaceable member 130) so that the curved edge 172a of the first face 148 is disposed in/on the approximate center 180 of the top face 182 of a head 134 of the bolt 132 (see FIGS. 5-6) or adjacent to an approximate center diameter 184 (FIG. 6) of the top face 182 of the head 134. In one embodiment, the top face 182 of the head 134 of the bolt 132 is disposed in a range of 15-51 cm, 20-36 cm or 25-31 cm from the first side edge 138 or second side edge 140 of the replaceable member 130. Alternatively, measurement from (the top faces 182 of heads 134 of) bolts 132 to other appropriate locations on the replaceable member 130 may also be utilized.

In block 915, the method 900 includes, while the cutting edge 144 abuts the notch 160 and the curved edge 172a is positioned/disposed on or adjacent to the approximate center 180 of the top face 182 of the head 134 of the bolt 132 (in other words, the curved edge 172a is disposed on or adjacent to an approximate center diameter 184 of the top face 182 of the head 134), identifying the horizontal line 168a on the first face 148 of the service tool 146 that ends adjacent to (or which of lines 168a is that most closely adjacent to) the center 180 of the top face 182 of the head 134 of the bolt 132.

In block 920, the method 900 further includes measuring a vertical distance V from the center 180 of the top face 182 to the cutting edge 144 by identifying the measurement 202 (FIG. 5) associated with that horizontal line 168a identified in block 915 as the vertical distance V from the center 180 of the top face 182 of the head 134 of the bolt 132 to the cutting edge 144 of the replaceable member 130.

In block 925, the method 900 further includes, while the cutting edge 144 abuts the notch 160 and the curved edge 172 is positioned/disposed on or adjacent to the approximate center 180 of the top face 182 of the head 134 of the bolt 132 (in other words, the curved edge 172a is disposed on or adjacent to a center diameter 184 (on which the center 180 lies) of the top face 182 of the head 134), identifying the vertical line 166 on the first face 148 the service tool 146 that ends adjacent to (or approximately adjacent to) the center 180 of the top face 182 of the head 134 of the bolt 132.

In block 930, the method 900 includes measuring the horizontal distance H from the center 180 of the top face 182 to the cutting edge 144 of the replaceable member 130 by identifying the (second) measurement 204 associated with that vertical line 166 identified in block 925 as the horizontal distance H of the center 180 of the top face 182 of the head 134 of the bolt 132 to the cutting edge 144 of the replaceable member 130.

Figure 10:
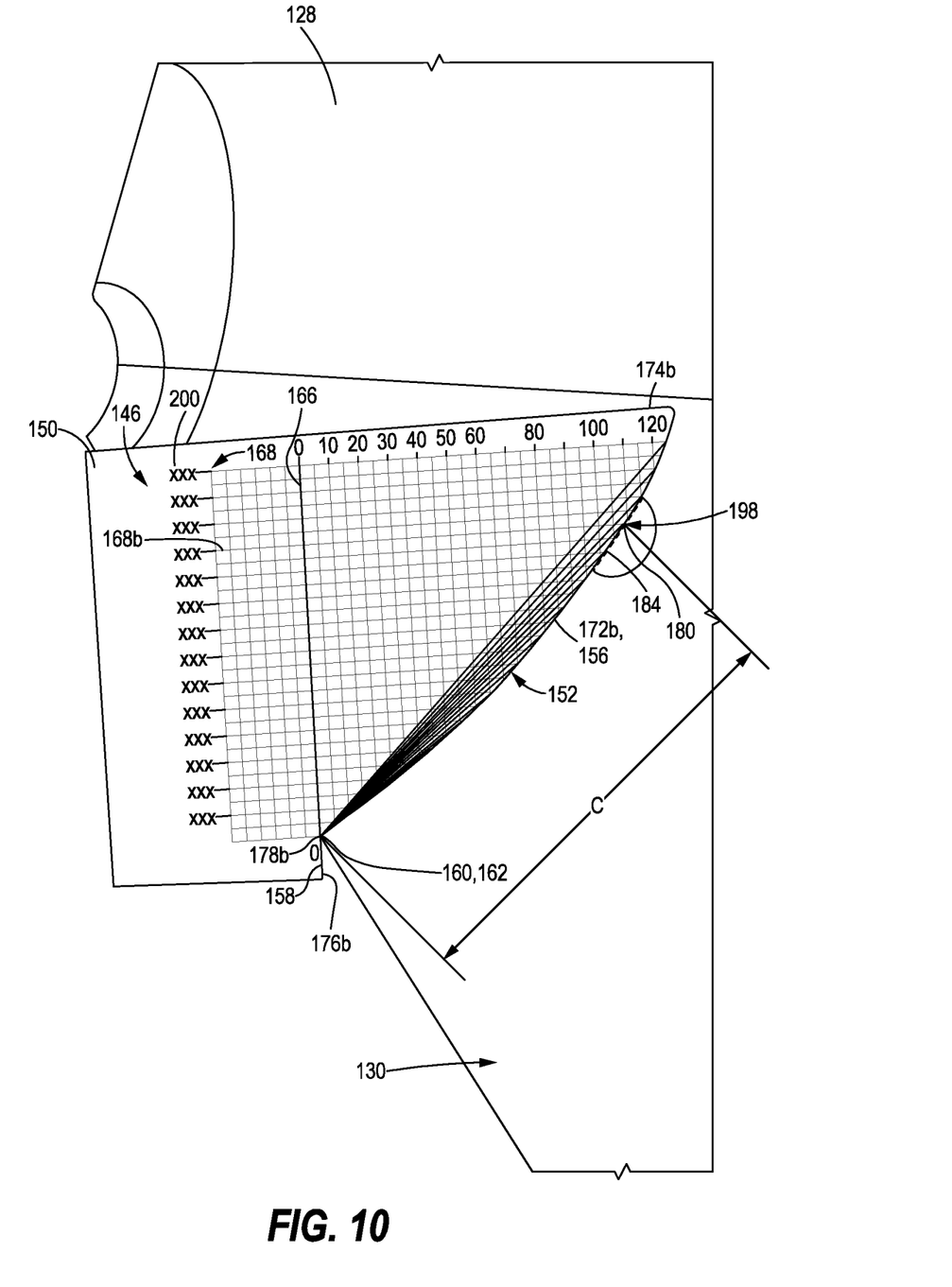
FIG. 10 is a perspective view of the embodiment of the service tool of FIG. 4 positioned to measure a hypotenuse distance C from the center of the top face of a head of a bolt to the cutting edge.

In some embodiments, but not all embodiment, the method 900 may also include blocks 935 and 940. If block 935 is included, the method 900 further includes abutting the cutting edge 144 against the notch 160, and abutting the curved portion 156 of the service tool 146 against the front surface 136 of the replaceable member 130 and against the top face 182 of the head 134 of the bolt 132 so that a (second) curved edge 172b (of the second face 150 of the service tool 146) is positioned/disposed on or adjacent to the approximate center 180 of the top face 182 of the head 134 of the bolt 132 (in other words, the curved edge 172b is disposed on or adjacent to the center diameter 184 (on which the center 180 lies) of the top face 182 of the head 134). Such center diameter 184 may or may not be labeled on the top face 182 of the head 134 of the bolt 132 (see FIG. 10).

If block 940 is included, the method 900 further includes, while the cutting edge 144 abuts the notch 160 and the second curved edge 172b is positioned in the approximate center 180 of the top face 182 of the head 134 of the bolt 132: identifying a hypotenuse line 198 (that extends from the origin 178b) and a horizontal line 168b (of the second plurality) on the second face 150 that both end (on the second curved edge 172b) adjacent to the center 180 of the top face 182 of the head 134 of the bolt 132, and then measuring the hypotenuse distance C from the center 180 of the top face 182 to the cutting edge 144 by identifying the measurement 200 associated with the identified horizontal line 168b of the second plurality.

Blocks 905-940 may be repeated to obtain measurements 202, 204, 200 of the vertical distance V, and/or the horizontal distance H, and/or the hypotenuse distance C, from the center 180 of the top face 182 of the head 134 of one or more other bolts 132. In one embodiment, at least two different bolts 132 are used, a first bolt 132 disposed near a first side edge 138 (for example, disposed in a range of 15-51 cm, 20-36 cm or 25-31 cm from the first side edge 138) and a second bolt 132 disposed near a second side edge 140 (for example, disposed in a range of 15-51 cm, 20-36 cm or 25-31 cm from the second side edge 140).

In block 945, the method 900 includes calibrating a position 206 of the cutting edge 144. Calibrating the position 206 of the cutting edge 144 may include providing one or more of the horizontal distance H, and/or the vertical distance V, and/or the hypotenuse distance C for one or more of the bolts 132 (top faces 182 of the heads 134 of the bolts 132) to a controller 190 of a grade control system 189 via a user interface 196.

It may be desirable to perform one or more of the steps shown in FIG. 9 in an order different from that depicted.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of calibrating a position of a cutting edge of a blade disposed on a machine, the blade including a moldboard coupled to a replaceable member by a plurality of bolts, the replaceable member including the cutting edge disposed at a bottom of a front surface of the replaceable member, the method comprising:
    performing for a first bolt and, optionally, a second bolt, of the plurality of bolts, the first bolt and the second bolt each respectively a measured bolt:
        abutting a notch of a service tool against the cutting edge and abutting a curved portion of the service tool against the front surface of the replaceable member and against a top face of a head of the measured bolt, wherein the service tool includes an inward-side face disposed between a first face and a second face, the inward-side face including the curved portion and the notch, the first face including a first curved edge, a plurality of horizontal lines marked on the first face and a plurality of vertical lines marked on the first face, wherein the first curved edge of the first face of the service tool is positioned adjacent to a center diameter of the top face of the head of the measured bolt;
        identifying a horizontal line on the first face that ends adjacent to a center of the top face of the head of the measured bolt;
        measuring a vertical distance from the center of the top face to the cutting edge by identifying a first measurement associated with the horizontal line identified on the first face;
        identifying a vertical line on the first face that ends adjacent to the center of the top face of the head of the measured bolt; and
        measuring a horizontal distance from the center of the top face to the cutting edge by identifying a second measurement associated with the vertical line identified; and
    calibrating the position of the cutting edge by providing to a grade control system the vertical distance and the horizontal distance measured for the first bolt and, optionally, the vertical distance and horizontal distance measured for the second bolt.

2. The method of claim 1, wherein the inward-side face further includes a leg portion that extends below the curved portion, wherein the notch is defined by the junction of the curved portion and the leg portion.

3. The method of claim 1, wherein the top face of the first bolt is disposed in a range of at least one of (a) 15-51 cm, (b) 20-36 cm, or (c) 25-31 cm from a first side edge of the replaceable member, and, optionally, the top face of the second bolt is disposed in a range of at least one of (d) 15-51 cm, (d) 20-36 cm, or (e) 25-31 cm from a second side edge of the replaceable member, the first side edge opposite to the second side edge.

4. The method of claim 1, wherein the curved portion is configured to be reciprocally shaped to at least part of front surface the replaceable member.

5. The method of claim 1 further comprising:
    performing for the first bolt and, optionally, the second bolt:
        abutting the cutting edge against the notch and abutting the curved portion of the service tool against the front surface of the replaceable member and against the top face of the head of the measured bolt, wherein the second face includes a second curved edge, a second plurality of horizontal lines marked on the second face and a plurality of hypotenuse lines marked on the second face, wherein the second curved edge of the second face of the service tool is disposed adjacent to the center diameter of the top face of the head of the measured bolt;
        identifying a hypotenuse line and an other horizontal line on the second face that both end adjacent to the center of the top face of the head of the measured bolt; and
        measuring a hypotenuse distance from the center of the top face to the cutting edge by identifying a measurement associated with the other horizontal line identified on the second face; and
    further calibrating the position of the cutting edge by providing to the grade control system the hypotenuse distance measured for the first bolt and, optionally, the hypotenuse distance measured for the second bolt.

6. The method of claim 1, wherein the service tool includes a handle portion disposed opposite to the inward-side face.

7. A service tool for calibrating a position of a cutting edge of a blade disposed on a machine, the blade including a moldboard coupled to a replaceable member by a plurality of bolts, the replaceable member including the cutting edge disposed at a bottom of a front surface of the replaceable member, the service tool comprising:
- an inward-side face disposed between a first face and a second face, the inward-side face including a curved portion, a leg portion and a notch defined by the junction of the curved portion and the leg portion, the notch configured to receive the cutting edge when the curved portion abuts the front surface of the replaceable member;
- the first face including a first curved edge, a plurality of horizontal lines marked on the first face and a plurality of vertical lines marked on the first face; and
- the second face disposed opposite to the first face,
- wherein, when the cutting edge is received in the notch, and the curved portion abuts the front surface and a top face of a head of a first bolt of the plurality of bolts, the plurality of horizontal lines is configured to measure a vertical distance from a center of the top face to the cutting edge, and the plurality of vertical lines is configured to measure a horizontal distance from the center of the top face to the cutting edge.

8. The service tool of claim 7, wherein the service tool includes a handle portion disposed opposite to the inward-side face.

9. The service tool of claim 7, wherein the curved portion is configured to be reciprocally shaped to at least a portion of the front surface of the replaceable member.

10. The service tool of claim 7, wherein the curved portion is configured to abut flushly against the front surface of the replaceable member.

11. The service tool of claim 7, wherein the notch is configured to abut the cutting edge when the cutting edge is received in the notch.

12. The service tool of claim 7, wherein when the cutting edge is received in the notch, the curved portion is configured to abut against the cutting edge and the leg portion is configured to abut against the cutting edge.

13. The service tool of claim 7 in which the second face further comprises:
- a second curved edge; and
- a second plurality of horizontal lines marked on the second face and a plurality of hypotenuse lines marked on the second face.

14. The service tool of claim 13, wherein the second plurality of horizontal lines meet the plurality of hypotenuse lines at the second curved edge.

15. The service tool of claim 13, wherein the second plurality of horizontal lines are configured to identify measurements of hypotenuse distances represented by the plurality of hypotenuse lines.

16. A method of calibrating a position of a cutting edge of a blade disposed on a machine, the blade including a moldboard coupled to a replaceable member by a plurality of bolts, the replaceable member including the cutting edge disposed at a bottom of a front surface of the replaceable member, the method comprising:
- performing for a first bolt and, optionally, a second bolt, of the plurality of bolts, the first bold and the second bolt each respectively a measured bolt:
  - abutting a notch of a service tool against the cutting edge and abutting a curved portion of the service tool against the front surface of the replaceable member and against a top face of a head of the measured bolt, wherein a first curved edge of a first face of the service tool is positioned adjacent to a center diameter of the top face of the head of the measured bolt, wherein the service tool includes an inward-side face disposed between the first face and a second face, the inward-side face including the curved portion, a leg portion disposed below the curved portion and the notch defined by the junction of the curved portion and the leg portion, the first face including the first curved edge, a plurality of horizontal lines marked on the first face and a plurality of vertical lines marked on the first face;
  - identifying a horizontal line on the first face that ends adjacent to a center of the top face of the head of the measured bolt;
  - measuring a vertical distance from the center of the top face to the cutting edge by identifying a first measurement associated with the horizontal line identified on the first face;
  - identifying a vertical line that ends adjacent to the center of the top face of the head of the measured bolt;
  - measuring a horizontal distance from the center of the top face to the cutting edge by identifying a second measurement associated with the vertical line identified;
  - abutting the cutting edge against the notch and abutting the curved portion of the service tool against the front surface of the replaceable member and against the top face of the head of the measured bolt, wherein a second curved edge of the second face of the service tool is disposed adjacent to the center diameter of the top face of the head of the bolt, wherein the second face includes the second curved edge, a second plurality of horizontal lines marked on the second face and a plurality of hypotenuse lines marked on the second face;
  - identifying a hypotenuse line and an other horizontal line on the second face that both end adjacent to the center of the top face of the head of the measured bolt; and
  - measuring a hypotenuse distance from the center of the top face to the cutting edge by identifying a third measurement associated with the other horizontal line identified on the second face; and
- calibrating the position of the cutting edge by providing to a grade control system the vertical distance and the horizontal distance and the hypotenuse distance measured for the first bolt and, optionally, the vertical distance and the horizontal distance and the hypotenuse distance measured for the second bolt.

17. The method of claim 16, wherein the first face includes an origin point disposed adjacent to the cutting edge and defined by the meeting of the first curved edge and a first leg edge.

18. The method of claim 16, wherein the top face of the first bolt is disposed in a range of (a) 15-51 cm, (b) 20-36 cm, or (c) 25-31 cm from a first side edge of the replaceable member, and, optionally, the top face of the second bolt is disposed in a range of (d) 15-51 cm (d) 20-36 cm, or (e) 25-31 cm from a second side edge of the replaceable member, the first side edge opposite to the second side edge.

19. The method of claim 16, wherein the replaceable member has a concave profile between a top edge and the cutting edge, the top edge opposite to the cutting edge.

20. The method of claim 16, wherein when the cutting edge is received in the notch, the curved portion is configured to abut against the cutting edge and the leg portion is configured to abut against the cutting edge.

* * * * *